US011901625B2

(12) United States Patent
Jia

(10) Patent No.: US 11,901,625 B2
(45) Date of Patent: Feb. 13, 2024

(54) ANTENNA APPARATUS AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 194 days.

(21) Appl. No.: 17/577,980

(22) Filed: Jan. 18, 2022

(65) Prior Publication Data

US 2022/0173519 A1 Jun. 2, 2022

Related U.S. Application Data

(63) Continuation of application No. PCT/CN2020/115516, filed on Sep. 16, 2020.

(30) Foreign Application Priority Data

Sep. 30, 2019 (CN) ......................... 201910948454.4

(51) Int. Cl.
*H01Q 15/00* (2006.01)
*H01Q 1/24* (2006.01)
(Continued)

(52) U.S. Cl.
CPC ........... *H01Q 15/0026* (2013.01); *H01Q 1/42* (2013.01); *H01Q 1/44* (2013.01); *H01Q 1/241* (2013.01)

(58) Field of Classification Search
CPC ........ H01Q 15/0026; H01Q 1/42; H01Q 1/44; H01Q 1/241; H01Q 1/425; H01Q 1/243;
(Continued)

(56) References Cited

U.S. PATENT DOCUMENTS 7,737,899 B1 6/2010 McKinzie, III
10,476,150 B2 * 11/2019 Toyao ...................... H01Q 1/44
(Continued)

FOREIGN PATENT DOCUMENTS

CA 2976942 A1 * 2/2018 ............ H01Q 1/241
CN 2865038 Y 1/2007
(Continued)

OTHER PUBLICATIONS

PCT/CN2020/115516—English translation (Year: 2020).*
(Continued)

*Primary Examiner* — Vibol Tan
(74) *Attorney, Agent, or Firm* — Young Basile Hanlon & MacFarlane, P.C.

(57) ABSTRACT

An antenna apparatus and an electronic device are provided. The antenna apparatus includes an antenna module and an antenna radome. The antenna module is configured to receive and emit a radio frequency (RF) signal of a preset frequency band toward a preset direction range. The antenna radome is spaced apart from the antenna module, and located within the preset direction range. The antenna radome includes a substrate and a resonant structure carried on the substrate. The substrate is configured to allow a RF signal of a first preset frequency band to pass through, the resonant structure is configured to adjust a passband width of the substrate to the RF signal, to make the antenna radome allow a RF signal of a second frequency band to pass through. A bandwidth of the second frequency band is greater than that of the first frequency band.

20 Claims, 11 Drawing Sheets

(51) Int. Cl.
*H01Q 1/42* (2006.01)
*H01Q 1/44* (2006.01)

(58) Field of Classification Search
CPC ... H01Q 1/22; H01Q 15/0013; H01Q 15/0093
See application file for complete search history.

(56) References Cited

U.S. PATENT DOCUMENTS

| | | | | |
|---|---|---|---|---|
| 11,205,850 | B2 * | 12/2021 | Jia | H01Q 9/0414 |
| 11,374,309 | B2 * | 6/2022 | Bisiules | H01Q 5/42 |
| 11,735,825 | B1 * | 8/2023 | Leung | H01Q 19/08 343/702 |
| 2011/0248890 | A1 | 10/2011 | Lee et al. | |
| 2013/0088396 | A1 | 4/2013 | Han | |
| 2019/0067806 | A1 | 2/2019 | Xu et al. | |
| 2019/0280391 | A1 * | 9/2019 | Sanjuan Flores | H01Q 19/17 |
| 2019/0386364 | A1 * | 12/2019 | Liang | H01Q 15/0086 |
| 2020/0373658 | A1 * | 11/2020 | Iluz | H01Q 15/0026 |

FOREIGN PATENT DOCUMENTS

| | | | |
|---|---|---|---|
| CN | 2872626 | Y | 2/2007 |
| CN | 2909557 | Y | 6/2007 |
| CN | 102664313 | A | 9/2012 |
| CN | 102694255 | A | 9/2012 |
| CN | 101425621 | B | 12/2012 |
| CN | 102969573 | A | 3/2013 |
| CN | 104201468 | A | 12/2014 |
| CN | 105576383 | A | 5/2016 |
| CN | 105609903 | A | 5/2016 |
| CN | 105914462 | A | 8/2016 |
| CN | 205543161 | U | 8/2016 |
| CN | 106602252 | A | 4/2017 |
| CN | 107093800 | A | 8/2017 |
| CN | 108777359 | A | 11/2018 |
| CN | 109066080 | A | 12/2018 |
| CN | 109167159 | A | 1/2019 |
| CN | 109301460 | A | 2/2019 |
| CN | 109411892 | A | 3/2019 |
| CN | 109728405 | A | 5/2019 |
| CN | 110021812 | A | 7/2019 |
| CN | 110048224 | A | 7/2019 |
| CN | 209298341 | U | 8/2019 |
| CN | 110416739 | A | 11/2019 |
| CN | 111224222 | A | 6/2020 |

OTHER PUBLICATIONS

Extended European Search Report for EP Application 20872662.0 dated Jul. 4, 2022. (15 pages).

Chen et al.,“Dual-band high-gain Fabry-Perot cavity antenna with a shared-aperture FSS layer”, IET Microwaves, Antennas & Propagation, vol. 12, Issue 13, 2018. (2007-2011 pages).

3GPP TS38.101-2, V15.3.0 dated Oct. 2018; 5G; NR; User Equipment (UE) radio transmission and reception; Part 2: Range 2 Standalone (3GPP TS 38.101-2 version 15.3.0 Release 15).

3GPP TR 38.803 V0.2.0 (Oct. 2016); 3rd Generation Partnership Project; Technical Specification Group Radio Access Network; Study on New Radio Access Technology; RF and co-existence aspects (Release 14).

High gain planar antenna using optimised partially reflective surfaces, dated Aug. 28, 2001; A.P. Feresidis and J.C. Vardaxoglou.

China First Office Action with English Translation issued in corresponding CN application No. 201910948454.4 dated Nov. 13, 2020.

China Second Office Action with English Translation issued in corresponding CN application No. 201910948454.4 dated Jun. 2, 2021.

China Notification to Grant Patent Right for Invention with English Translation issued in corresponding CN application No. 201910948454.4 dated Aug. 6, 2021.

International search report with English Translation issued in corresponding PCT/CN2020/115516 dated Dec. 11, 2020.

* cited by examiner

ANTENNA APPARATUS AND ELECTRONIC DEVICE

CROSS-REFERENCE TO RELATED APPLICATION(S)

This application is a continuation of International Application No. PCT/CN2020/115516, filed on Sep. 16, 2020, which claims priority to Chinese Patent Application No. 201910948454.4, filed on Sep. 30, 2019, the entire disclosures of both of which are incorporated herein by reference.

TECHNICAL FIELD

This disclosure relates to the field of electronic devices, and in particular to an antenna apparatus and an electronic device.

BACKGROUND

With development of mobile communication technology, the traditional 4th-generation (4G) mobile communication can no longer meet people's requirements. The 5th-generation (5G) mobile communication is favored by users because of its high communication speed. For example, a data transmission speed in the 5G mobile communication is hundreds of times faster than that in the 4G mobile communication. The 5G mobile communication is mainly implemented via millimeter wave (mmWave) signals. However, when a mmWave antenna is applicable to an electronic device, the mmWave antenna is generally disposed within an accommodating space in the electronic device, while mmWave signals radiated out through the electronic equipment have low transmittance, which cannot meet requirements of antenna radiation performance. Alternatively, external mmWave signals penetrating through the electronic equipment have low transmittance. It can be seen that in the related art, 5G mmWave signals have poor communication performance.

SUMMARY

An antenna apparatus is provided in the present disclosure, and the antenna apparatus includes an antenna module and an antenna radome. The antenna module is configured to receive and emit a radio frequency (RF) signal of a preset frequency band toward a preset direction range. The antenna radome is spaced apart from the antenna module, located within the preset direction range, and includes a substrate and a resonant structure carried on the substrate. The substrate is configured to allow a RF signal of a first frequency band in the preset frequency band to pass through, the resonant structure is configured to adjust a passband width of the substrate to the RF signal of the preset frequency band, to make the antenna radome allow a RF signal of a second frequency band in the preset frequency band to pass through. A bandwidth of the second frequency band is greater than a bandwidth of the first frequency band, and the RF signal of the second frequency band includes the RF signal of the first frequency band.

An antenna apparatus is also provided in the present disclosure, and the antenna apparatus includes an antenna module and an antenna radome. The antenna module is configured to receive and emit a RF signal of a preset frequency band toward a preset direction range. The antenna radome is spaced apart from the antenna module, located within the preset direction range, and includes a substrate and a resonant structure carried on the substrate. A difference between a reflection phase of the antenna radome to the RF signal of the preset frequency band and an incident phase of the antenna radome to the RF signal of the preset frequency band increases as a frequency increases, and the RF signal of the preset frequency band is allowed to pass through the antenna radome.

An electronic device is also provided in the present disclosure, and the electronic device includes a controller and an antenna apparatus. The antenna apparatus is electrically connected with the controller, and an antenna module in the antenna apparatus is configured to receive and emit a RF signal through an antenna radome in the antenna apparatus under control of the controller.

BRIEF DESCRIPTION OF DRAWINGS

In order to describe technical solutions of implementations of the present disclosure more clearly, the following will give a brief introduction to the accompanying drawings used for describing the implementations. Apparently, the accompanying drawings hereinafter described are merely some implementations of the present disclosure. Based on these drawings, those of ordinary skill in the art can also obtain other drawings without creative effort.

DETAILED DESCRIPTION

Figure 1:
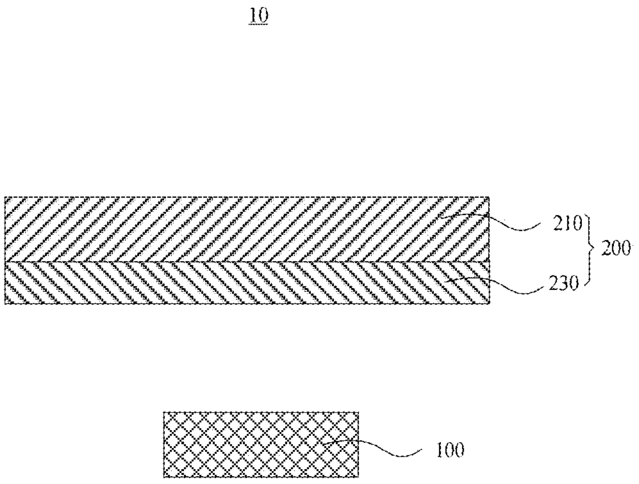
FIG. 1 is a schematic view illustrating an antenna apparatus provided in implementations of the present disclosure.

In a first aspect, an antenna apparatus is provided in the present disclosure, and the antenna apparatus includes an antenna module and an antenna radome. The antenna module is configured to receive and emit a radio frequency (RF) signal of a preset frequency band within a preset direction range. The antenna radome is spaced apart from the antenna module, located within the preset direction range, and includes a substrate and a resonant structure carried on the substrate. The substrate is configured to allow a RF signal of a first frequency band in the preset frequency band to pass through, the resonant structure is configured to adjust a passband width of the substrate to the RF signal of the preset frequency band, to make the antenna radome allow a RF signal of a second frequency band in the preset frequency band to pass through. A bandwidth of the second frequency band is greater than a bandwidth of the first frequency band, and the RF signal of the second frequency band includes the RF signal of the first frequency band.

The resonant structure includes a first resonant layer and a second resonant layer which are stacked, the first resonant layer is farther away from the antenna module than the second resonant layer, a resonant frequency of the first resonant layer is a first frequency, a frequency of the second resonant layer is a second frequency, and the first frequency is greater than the second frequency.

The first resonant layer includes multiple first resonant units arranged at regular intervals, the second resonant layer includes multiple second resonant units arranged at regular intervals, each of the multiple first resonant units and each of the multiple second resonant units are both conductive patches, each of the multiple first resonant units has a side length of L1, each of the multiple second resonant units has a side length of L2, where $L1<L2<P$, and P is an arrangement interval of the multiple first resonant units and the multiple second resonant units.

The first resonant layer includes multiple first resonant units arranged at regular intervals, the second resonant layer includes multiple second resonant units arranged at regular intervals, each of the multiple first resonant units is a conductive patch, each of the multiple second resonant units is a conductive patch and defines a hollow structure penetrating through two opposite surfaces of each of the multiple second resonant units, each of the multiple first resonant units has a side length of L1, each of the multiple second resonant units has a side length of L2, where $P>L1\leq L2$, P is an arrangement interval of the multiple first resonant units and the multiple second resonant units, and a larger area of the hollow structure leads to a greater difference between L1 and L2.

The first resonant layer includes multiple first resonant units arranged at regular intervals, the second resonant layer includes multiple second resonant units arranged at regular intervals, each of the multiple first resonant units is a conductive patch and defines a first hollow structure penetrating through two opposite surfaces of each of the multiple first resonant units, each of the multiple second resonant units is a conductive patch and defines a second hollow structure penetrating through two opposite surfaces of each of the multiple second resonant units, an arrangement interval of the multiple first resonant units and the multiple second resonant units is P, each of the multiple first resonant units has a side length of L1, each of the multiple second resonant units has a side length of L2, where $P>L1\geq L2$, and an area of the first hollow structure is less than an area of the second hollow structure.

The first resonant layer and the second resonant layer are insulated.

The first resonant layer is electrically connected with the second resonant layer through a connecting member.

The resonant structure includes multiple first conductive lines spaced apart from one another and multiple second conductive lines spaced apart from one another, the multiple first conductive lines are intersected with the multiple second conductive lines, and the multiple first conductive lines are electrically connected with the multiple second conductive lines at intersections.

The resonant structure includes multiple conductive grids arranged in an array, each of the multiple conductive grids is enclosed by at least one conductive line, and two adjacent conductive grids at least partially share the at least one conductive line.

A difference $\phi R$ between a reflection phase of the resonant structure to the RF signal of the preset frequency band and an incident phase of the resonant structure to the RF signal of the preset frequency band satisfies:

$$\phi R = \frac{4\pi h}{c} f - (2N-1)\pi,$$

where h represents the length of a center line from a radiation surface of the antenna module to a surface of the resonant structure facing the antenna module, c represents the speed of light, and f represents a frequency of the RF signal, the center line being a straight line perpendicular to the radiation surface of the antenna module.

A maximum value $D_{max}$ of a directivity coefficient of the antenna module satisfies:

$$D_{max} = \frac{1+R}{1-R},$$

where $R=S_{11}^2$, and $S_{11}$ represents an amplitude of a reflection coefficient of the antenna radome to the RF signal.

The preset frequency band at least includes a full frequency band of 3rd generation partnership project (3GPP) millimeter wave (mmWave).

In a second aspect, an antenna apparatus is provided in the present disclosure, and the antenna apparatus includes an antenna module and an antenna radome. The antenna module is configured to receive and emit a RF signal of a preset frequency band toward a preset direction range. The antenna radome is spaced apart from the antenna module, located within the preset direction range, and includes a substrate and a resonant structure carried on the substrate. A difference between a reflection phase of the antenna radome to the RF signal of the preset frequency band and an incident phase of the antenna radome to the RF signal of the preset frequency band increases as a frequency of the RF signal increases, and the RF signal of the preset frequency band is allowed to pass through the antenna radome.

A difference between a reflection phase of the substrate to the RF signal of the preset frequency band and an incident phase of the substrate to the RF signal of the preset frequency band decreases as the frequency increases, and a difference between a reflection phase of the resonant structure to the RF signal of the preset frequency band and an incident phase of the resonant structure to the RF signal of the preset frequency band increases as the frequency increases.

The resonant structure includes a first resonant layer and a second resonant layer which are stacked, the first resonant layer is farther away from the antenna module than the second resonant layer, a resonant frequency of the first resonant layer is a first frequency, a resonant frequency of the second resonant layer is a second frequency, and the first frequency is greater than the second frequency.

The first resonant layer includes multiple first resonant units arranged at regular intervals, the second resonant layer includes multiple second resonant units arranged at regular intervals, each of the multiple first resonant units and each of the multiple second resonant units are both conductive patches, each of the multiple first resonant units has a side length of L1, each of the multiple second resonant units has a side length of L2, where L1<L2<P, and P is an arrangement interval of the multiple first resonant units and the multiple second resonant units.

A difference ϕR between a reflection phase of the resonant structure to the RF signal of the preset frequency band and an incident phase of the resonant structure to the RF signal of the preset frequency band satisfies:

$$\phi R = \frac{4\pi h}{c} f - (2N-1)\pi,$$

where h represents the length of a center line from a radiation surface of the antenna module to a surface of the resonant structure facing the antenna module, c represents the speed of light, and f represents a frequency of the RF signal, the center line being a straight line perpendicular to the radiation surface of the antenna module.

A maximum value $D_{max}$ of a directivity coefficient of the antenna module satisfies:

$$D_{max} = \frac{1+R}{1-R},$$

where $R=S_{11}^2$, and $S_{11}$ represents an amplitude of a reflection coefficient of the antenna radome to the RF signal.

In a third aspect, an electronic device is provided in the present disclosure, and the electronic device includes a controller and the antenna apparatus according to any one of: the first aspect, any one of implementations in the first aspect, the second aspect, and any one of implementations in the second aspect. The antenna apparatus is electrically connected with the controller, and the antenna module in the antenna apparatus is configured to receive and emit a RF signal through the antenna radome in the antenna apparatus under control of the controller.

The electronic device includes a battery cover, where the substrate at least includes the battery cover, the battery cover is located within the preset direction range of the RF signal of the preset frequency band received and emitted by the antenna module, and the resonant structure is located on a side of the battery cover facing the antenna module.

The battery cover includes a back plate and a frame connected with a periphery of the back plate, and the back plate is located within the preset direction range.

The electronic device further includes a screen, where the substrate at least includes the screen, the screen includes a cover plate and a display module stacked with the cover plate, and the resonant structure is located between the cover plate and the display module.

Technical solutions of implementations of the present disclosure will be described clearly and completely with reference to accompanying drawings in the implementations of the present disclosure. Apparently, implementations described herein are merely some implementations, rather than all implementations, of the present disclosure. Based on the implementations of the present disclosure, all other implementations obtained by those of ordinary skill in the art without creative effort shall fall within the protection scope of the present disclosure.

Reference is made to FIG. 1, which is a schematic view illustrating an antenna apparatus provided in implementations of the present disclosure. An antenna apparatus 10 includes an antenna module 100 and an antenna radome 200. The antenna module 100 is configured to receive and emit a RF signal of a preset frequency band toward a preset direction range. The antenna radome 200 is spaced apart from the antenna module 100, located within the preset direction range, and includes a substrate 210 and a resonant structure 230 carried on the substrate 210. The substrate 210 is configured to allow a RF signal of a first frequency band in the preset frequency band to pass through, the resonant structure 230 is configured to adjust a passband width of the substrate 210 to the RF signal of the preset frequency band, to make the antenna radome 200 allow a RF signal of a second frequency band in the preset frequency band to pass through. A bandwidth of the second frequency band is greater than a bandwidth of the first frequency band, and the RF signal of the second frequency band includes the RF signal of the first frequency band.

For example, the substrate 210 is configured to allow a RF signal of frequency band f1 in the preset frequency band to pass through, and the antenna radome 200 is configured to allow RF signals of frequency band f1, frequency band f2, frequency band f3, and frequency band f4 in the preset frequency band to pass through. A bandwidth of the RF signal of frequency band f1 is a first bandwidth F1. A bandwidth of the RF signals of frequency band f1, frequency band f2, frequency band f3, and frequency band f4 is a second bandwidth F2. As such the second bandwidth F2 is greater than the first bandwidth F1, and a RF signal of the second bandwidth F2 includes a RF signal of the first bandwidth F1.

The RF signal may be, but is not limited to, a RF signal in a mmWave frequency band or a RF signal in a terahertz (THz) frequency band. At present, in the 5th generation (5G) wireless systems, with accordance to the protocol of the 3rd generation partnership project (3GPP) technical specification (TS) 38.101, 5G new radio (NR) mainly uses two frequency bands: a frequency range 1 (FR1) band and a frequency range 2 (FR2) band. The FR1 band has a frequency range of 450 megahertz (MHz)-6 gigahertz (GHz), and is also known as the sub-6 GHz band. The FR2 band has a frequency range of 24.25 Ghz-52.6 Ghz, and belongs to the mmWave frequency band. The 3GPP Release 15 specifies that the present 5G mmWave frequency bands include: n257 (26.5~29.5 Ghz), n258 (24.25~27.5 Ghz), n261 (27.5~28.35 Ghz), and n260 (37~40 GHz).

In an implementation, the resonant structure 230 is carried on all regions of the substrate 210. In another implementation, the resonant structure 230 is carried on a partial region of the substrate 210. In FIG. 1, an example that the resonant structure 230 is carried on all regions of the substrate 210 is taken for illustration. In this implementation, that the resonant structure 230 is carried on the substrate 210 is that the resonant structure 230 is directly disposed on a surface of the substrate 210 facing the antenna module 100. It can be understood that the resonant structure 230 may be integrated, or non-integrated.

Compared to the related art, the antenna apparatus 10 provided in the present disclosure is provided with the resonant structure 230 carried on the substrate 210. The resonant structure 230 can improve a bandwidth of the antenna radome 200 to the RF signal of the preset frequency band, and reduce an impact of the substrate 210 on radiation performance of the RF signal of the preset frequency band. When the antenna apparatus 10 is applicable to an electronic device 1, communication performance of the electronic device 1 can be improved.

Figure 2:
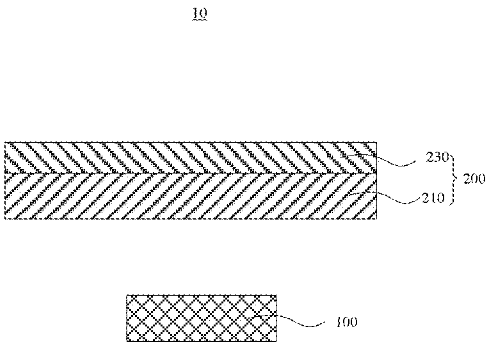
FIG. 2 is a schematic view illustrating an antenna apparatus provided in other implementations of the present disclosure.

Reference is made to FIG. 2, which is a schematic view illustrating an antenna apparatus provided in other implementations of the present disclosure. The antenna apparatus 10 includes an antenna module 100 and an antenna radome 200. The antenna module 100 is configured to receive and emit a RF signal of a preset frequency band toward a preset direction range. The antenna radome 200 is spaced apart from the antenna module 100, located within the preset direction range, and includes a substrate 210 and a resonant structure 230 carried on the substrate 210. The substrate 210 is configured to allow a RF signal of a first frequency band in the preset frequency band to pass through, the resonant structure 230 is configured to adjust a passband width of the substrate 210 to the RF signal of the preset frequency band, to make the antenna radome 200 allow a RF signal of a second frequency band in the preset frequency band to pass through. A bandwidth of the second frequency band is greater than a bandwidth of the first frequency band, and the RF signal of the second frequency band includes the RF signal of the first frequency band. Furthermore, in this implementation, when the resonant structure 230 is carried on the substrate 210, the resonant structure 230 is disposed on a surface of the substrate 210 away from the antenna module 100.

Figure 3:
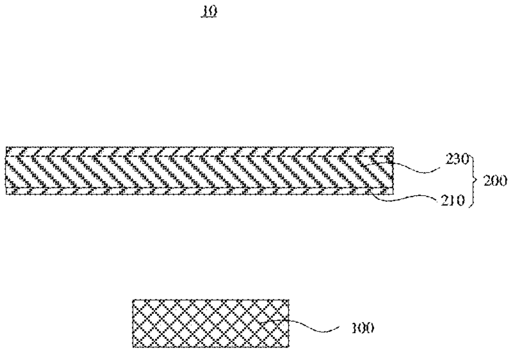
FIG. 3 is a schematic view illustrating an antenna apparatus provided in other implementations of the present disclosure.

Reference is made to FIG. 3, which is a schematic view illustrating an antenna apparatus provided in other implementations of the present disclosure. The antenna apparatus 10 includes an antenna module 100 and an antenna radome 200. The antenna module 100 is configured to receive and emit a RF signal of a preset frequency band toward a preset direction range. The antenna radome 200 is spaced apart from the antenna module 100, located within the preset direction range, and includes a substrate 210 and a resonant structure 230 carried on the substrate 210. The substrate 210 is configured to allow a RF signal of a first frequency band in the preset frequency band to pass through, the resonant structure 230 is configured to adjust a passband width of the substrate 210 to the RF signal of the preset frequency band, to make the antenna radome 200 allow a RF signal of a second frequency band in the preset frequency band to pass through. A bandwidth of the second frequency band is greater than a bandwidth of the first frequency band, and the RF signal of the second frequency band includes the RF signal of the first frequency band. Furthermore, when the resonant structure 230 is carried on the substrate 210, the resonant structure 230 is embedded in the substrate 210.

Figure 4:
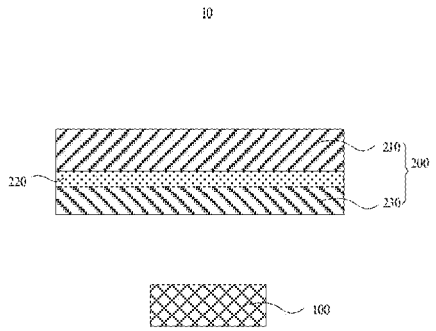
FIG. 4 is a schematic view illustrating an antenna apparatus provided in other implementations of the present disclosure.

Reference is made to FIG. 4, which is a schematic view illustrating an antenna apparatus provided in other implementations of the present disclosure. The antenna apparatus 10 includes an antenna module 100 and an antenna radome 200. The antenna module 100 is configured to receive and emit a RF signal of a preset frequency band toward a preset direction range. The antenna radome 200 is spaced apart from the antenna module 100, located within the preset direction range, and includes a substrate 210 and a resonant structure 230 carried on the substrate 210. The substrate 210 is configured to allow a RF signal of a first frequency band in the preset frequency band to pass through, the resonant structure 230 is configured to adjust a passband width of the substrate 210 to the RF signal of the preset frequency band, to make the antenna radome 200 allow a RF signal of a second frequency band in the preset frequency band to pass through. A bandwidth of the second frequency band is greater than a bandwidth of the first frequency band, and the RF signal of the second frequency band includes the RF signal of the first frequency band. Furthermore, when the resonant structure 230 is carried on the substrate 210, the resonant structure 230 is attached to a carrier film 220 and then attached to a surface of the substrate 210 through the carrier film 220. The carrier film 220 may be, but is not limited to, a plastic (e.g., polyethylene terephthalate (PET)) film, a flexible circuit board, a printed circuit board, etc. The PET film may be, but is not limited to, a color film, an explosion-proof film, etc. In the schematic view of this implementation, an example that the resonant structure 230 is carried on a surface of the substrate 210 facing the antenna module 100 is taken for illustration. In other implementations, the resonant structure 230 is attached to a surface of the substrate 210 away from the antenna module 100 through the carrier film 220.

Figure 5:
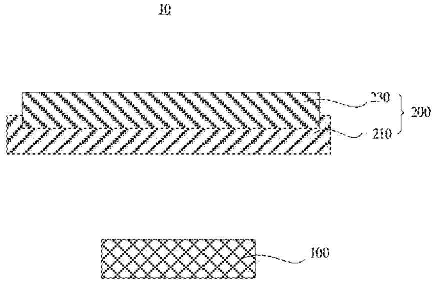
FIG. 5 is a schematic view illustrating an antenna apparatus provided in other implementations of the present disclosure.

Reference is made to FIG. 5, which is a schematic view illustrating an antenna apparatus provided in other implementations of the present disclosure. In this implementation, a part of the resonant structure 230 is disposed on a surface of the substrate 210 away from the antenna module 100, the rest of the resonant structure 230 is embedded in the substrate 210. It can be understood that in other implementations, a part of the resonant structure 230 is disposed on a surface of the substrate 210 close to the antenna module 100, and the rest of the resonant structure 230 is embedded in the substrate 210.

The above are some implementations of the resonant structure 230 being carried on the substrate 210. It can be understood that the present disclosure does not limit specific forms of the resonant structure 230 being carried on the substrate 210, as long as the resonant structure 230 is disposed at the substrate 210.

Figure 6:
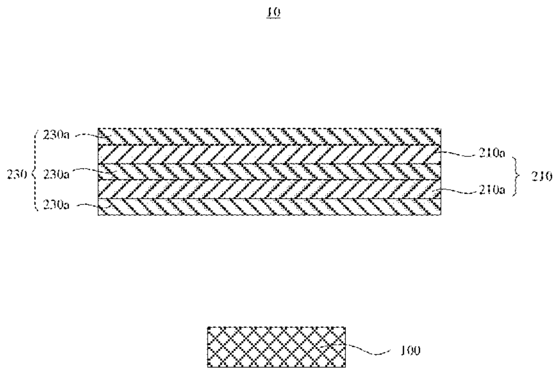
FIG. 6 is a schematic view illustrating a resonant structure provided in implementations of the present disclosure.

Reference is made to FIG. 6, which is a schematic view illustrating a resonant structure provided in implementations of the present disclosure. The resonant structure 230 includes one or more resonant layers 230*a*. When the resonant structure 230 includes multiple resonant layers 230*a*, the multiple resonant layers 230*a* are stacked in a preset direction and spaced apart from one another. When the resonant structure 230 includes the multiple resonant layers 230*a*, a dielectric layer 210*a* is disposed between each two adjacent resonant layers 230*a*, an outermost resonant layer 230*a* may also be covered by the dielectric layer 210*a*, or the outermost resonant layer 230*a* may not be covered by the dielectric layer 210*a*, and all dielectric layers 210*a* constitute the substrate 210. In the schematic view of this implementation, an example that the resonant structure 230 includes three resonant layers 230*a* is taken for illustration. Optionally, the preset direction is parallel to a direction of a main lobe of the RF signal. The main lobe refers to a beam with a maximum radiation intensity in the RF signal. When the preset direction is parallel to the direction of the main lobe of the RF signal, the multiple resonant layers 230*a* are stacked in the preset direction, which can maximize a bandwidth of the RF signal passing through the antenna radome 200.

Reference is made to the antenna apparatus 10 provided in any of the foregoing implementations, and the resonant structure 230 is made of a metal material or a non-metal conductive material. When the resonant structure 230 is made of the non-metal conductive material, the resonant structure 230 may be made of a transparent non-metal conductive material, for example, indium tin oxide (ITO), etc.

Reference is made to the antenna apparatus 10 provide in any of the foregoing implementations, and the substrate 210 is made of any one or any combination of: plastic, glass, sapphire, and ceramic.

Figure 7:
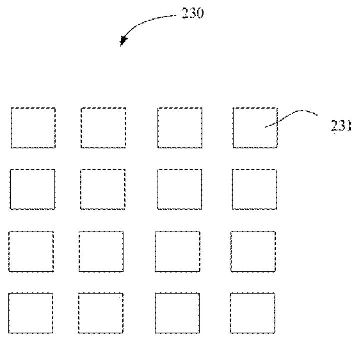
FIG. 7 is a schematic view illustrating a resonant structure provided in other implementations of the present disclosure.

Reference is made to FIG. 7, which is a schematic view illustrating a resonant structure provided in other implementations of the present disclosure. A resonant structure 230 may be incorporated into the antenna apparatus 10 provided in any of the foregoing implementations. The resonant structure 230 includes multiple resonant units 231 arranged at regular intervals. The multiple resonant units 231 are arranged at regular intervals, which makes the resonant structure 230 easier to be manufactured.

Figure 8:
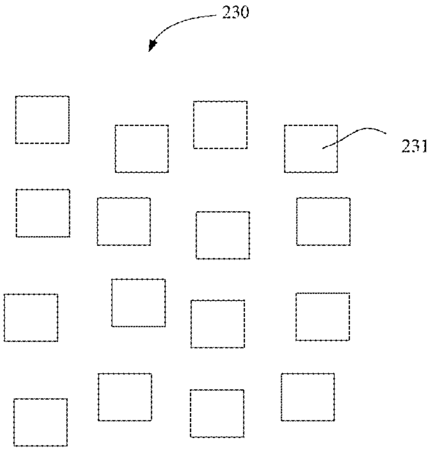
FIG. 8 is a schematic view illustrating a resonant structure provided in other implementations of the present disclosure.

Reference is made to FIG. 8, which is a schematic view illustrating a resonant structure provided in other implementations of the present disclosure. A resonant structure 230 may be incorporated into the antenna apparatus 10 provided in any of the foregoing implementations. The resonant structure 230 includes multiple resonant units 231 arranged at irregular intervals.

Figure 9:
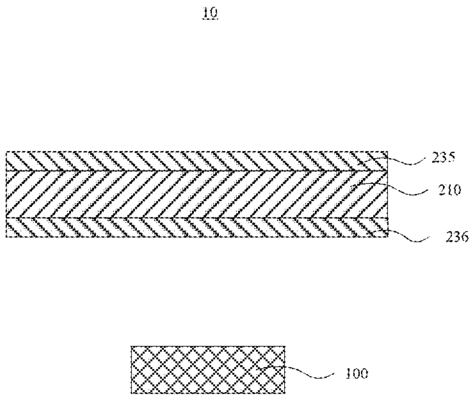
FIG. 9 is a schematic view illustrating a resonant structure provided in other implementations of the present disclosure.

Reference is made to FIG. 9, which is a schematic view illustrating a resonant structure provided in other implementations of the present disclosure. A resonant structure 230 may be incorporated into the antenna apparatus 10 provided in any of the foregoing implementations. The resonant structure 230 includes a first resonant layer 235 and a second resonant layer 236 which are stacked. The first resonant layer 235 is farther away from the antenna module 100 than the second resonant layer 236. A resonant frequency of the first resonant layer 235 is a first frequency, a resonant frequency of the second resonant layer 236 is a second frequency, and the first frequency is greater than the second frequency.

The resonant frequency of the first resonant layer 235 is the first frequency, which means that when a RF signal emitted by the antenna module 100 passes through the first resonant layer 235, the first resonant layer 235 resonates at the first frequency. The resonant frequency of the second resonant layer 236 is the second frequency, which means that when the RF signal emitted by the antenna module 100 passes through the second resonant layer 236, the second resonant layer 236 resonates at the second frequency. When the first resonant layer 235 is farther away from the antenna module 100 than the second resonant layer 236, and the resonant frequency of the first resonant layer 235 is greater than the resonant frequency of the second resonant layer 236, it can be seen through simulation that a bandwidth of the RF signal passing through the antenna radome 200 increases compared to a bandwidth of the RF signal passing through the substrate 210.

Generally, when resonant layers (e.g., the first resonant layer 235, and the second resonant layer 236) in the resonant structure 230 are both conductive patches, a higher resonant frequency of the resonant layer corresponds to a smaller size of the resonant layer. When the first resonant layer 235 and the second resonant layer 236 are both conductive patches, since the first frequency is greater than the second frequency, the size of the first resonant layer 235 is less than the size of the second resonant layer 236. The first resonant layer 235 is disposed farther away from the antenna module 100 than the second resonant layer 236, such that resonance of the first resonant layer 235 with a smaller size will not shield resonance of the second resonant layer 236 with a larger size at the second frequency, thereby helping to improve communication effect of the antenna apparatus 10.

Figure 10:
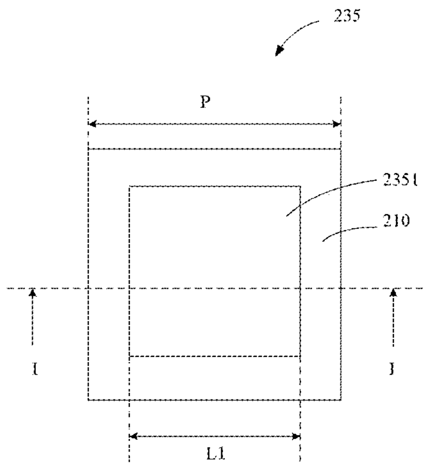
FIG. 10 is a top view illustrating a first resonant unit provided in implementations of the present disclosure.
Figure 11:
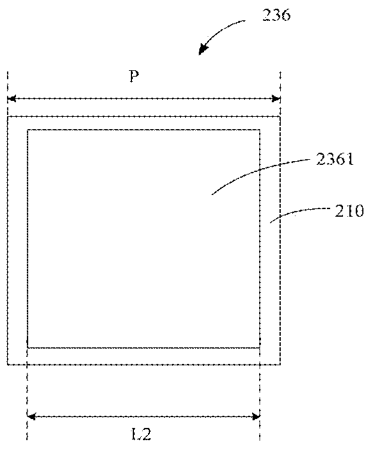
FIG. 11 is a bottom view illustrating a second resonant unit provided in implementations of the present disclosure.
Figure 12:
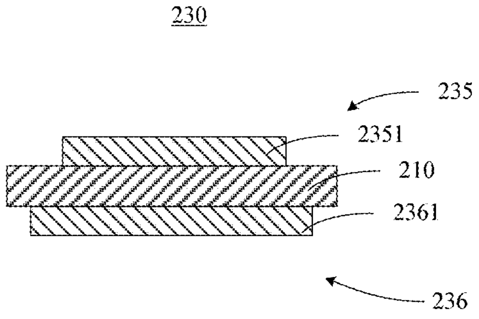
FIG. 12 is a cross-sectional view of FIG. 10, taken along I-I line.

Reference is made to FIG. 10, FIG. 11, and FIG. 12 together, where FIG. 10 is a top view illustrating a first resonant unit provided in implementations of the present disclosure, FIG. 11 is a bottom view illustrating a second resonant unit provided in implementations of the present disclosure, and FIG. 12 is a cross-sectional view of FIG. 10, taken along I-I line. In this implementation, the first resonant layer 235 includes multiple first resonant units 2351 arranged at regular intervals, the second resonant layer 236 includes multiple second resonant units 2361 arranged at regular intervals, and each of the multiple first resonant units 2351 and each of the multiple second resonant units 2361 are both conductive patches. Each of the multiple first resonant units 2351 has a side length of L1, each of the multiple second resonant units 2361 has a side length of L2, where $L1<L2<P$, and P is an arrangement interval of the multiple first resonant units 2351 and the multiple second resonant units 2361. This structure of the multiple first resonant units 2351 and the multiple second resonant units 2361 can make a resonant frequency of the first resonant layer 235 greater than a resonant frequency of the second resonant layer 236.

In schematic views of this implementation, only one first resonant unit 2351 is illustrated in the first resonant layer 235, and only one second resonant unit 2361 is illustrated in the second resonant layer 236.

When each of the multiple first resonant units 2351 is a conductive patch and the conductive patch does not define a hollow structure, a resonant frequency of each of the multiple first resonant units 2351 decreases as a side length of each of the multiple first resonant units 2351 increases. Correspondingly, when each of the multiple second resonant units 2361 is a conductive patch and the conductive patch does not define a hollow structure, a resonant frequency of each of the multiple second resonant units 2361 decreases as a side length of each of the multiple second resonant units 2361 increases. Therefore, when the side length of each of the multiple first resonant units 2351 is less than the side length of each of the multiple second resonant units 2361, the resonant frequency of the first resonant layer 235 is greater than the resonant frequency of the second resonant layer 236. In the schematic views of this implementation, an example that a shape of each of the multiple first resonant units 2351 is the same as a shape of each of the multiple second resonant units 2361 and the shape of each of the multiple first resonant units 2351 and the shape of each of the multiple second resonant units 2361 are both squares is taken for illustration, it can be understood that the shape of each of the multiple first resonant units 2351 may also be different from the shape of each of the multiple second resonant units 2361. It can be understood that when each of the multiple first resonant units 2351 and each of the multiple second resonant units 2361 are round-pie shaped, the side length of each of the multiple first resonant units 2351 may also be understood as a perimeter of each of the multiple first resonant units 2351, in other words, the perimeter of each of the multiple first resonant units 2351 is less than a perimeter of each of the multiple second resonant units 2361, and a diameter of each of the multiple second resonant units 2361 is less than the arrangement interval of the multiple first resonant units 2351 and the multiple second resonant units 2361.

Figure 13:
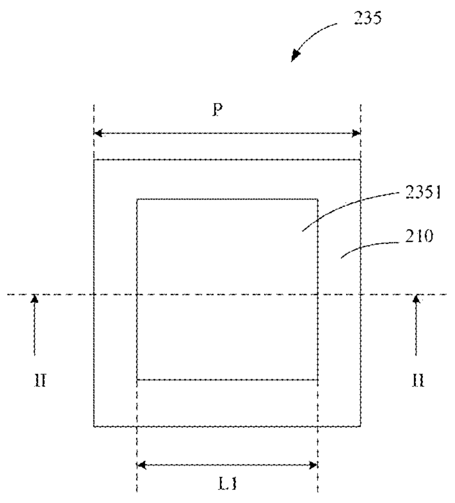
FIG. 13 is a top view illustrating a first resonant unit provided in other implementations of the present disclosure.
Figure 14:
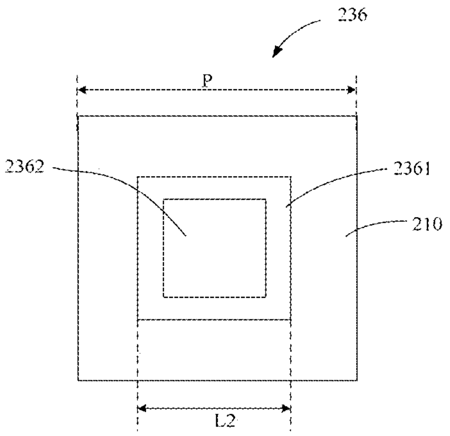
FIG. 14 is a bottom view illustrating a second resonant unit provided in other implementations of the present disclosure.
Figure 15:
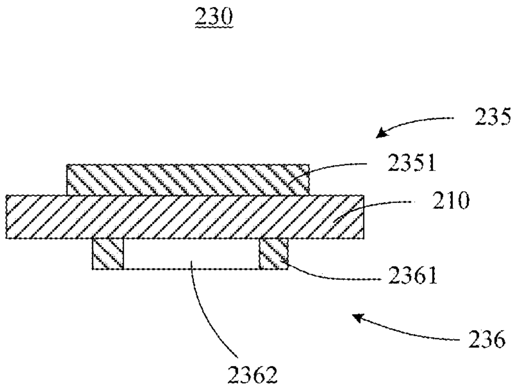
FIG. 15 is a cross-sectional view of FIG. 13, taken along II-II line.

Reference is made to FIG. 13, FIG. 14, and FIG. 15 together, where FIG. 13 is a top view illustrating a first resonant unit provided in other implementations of the present disclosure, FIG. 14 is a bottom view illustrating a second resonant unit provided in other implementations of the present disclosure, and FIG. 15 is a cross-sectional view of FIG. 13, taken along II-II line. In this implementation, the first resonant layer 235 includes multiple first resonant units 2351 arranged at regular intervals, the second resonant layer 236 includes multiple second resonant units 2361 arranged at regular intervals. Each of the multiple first resonant units 2351 is a conductive patch, and each of the multiple second resonant units 2361 is a conductive patch and defines a hollow structure 2362 penetrating through two opposite surfaces of each of the multiple second resonant units 2361. Each of the multiple first resonant units 2351 has a side length of L1, each of the multiple second resonant units 2361 has a side length of L2, where $P>L1\geq L2$, P is an arrangement interval of the multiple first resonant units 2351 and the multiple second resonant units 2361, and a larger area of the hollow structure 2362 leads to a greater difference between L1 and L2. This structure of the multiple first resonant units 2351 and the multiple second resonant units 2361 can make a resonant frequency of the first resonant layer 235 greater than a resonant frequency of the second resonant layer 236.

In schematic views of this implementation, only one first resonant unit 2351 is illustrated in the first resonant layer 235, and only one second resonant unit 2361 is illustrated in the second resonant layer 236. In this implementation, an example that the side length L1 of each of the multiple first resonant units 2351 is greater than the side length L2 of each of the multiple second resonant units 2361 is taken for illustration.

Compared to each of the multiple second resonant units 2361 without a hollow structure, by defining the hollow structure 2362 on each of the multiple second resonant units 2361 in this implementation, the size of each of the multiple second resonant units 2361 can be reduced, which facilitates miniaturization of each of the multiple second resonant units 2361, and further facilitates miniaturization of the resonant structure 230.

Figure 16:
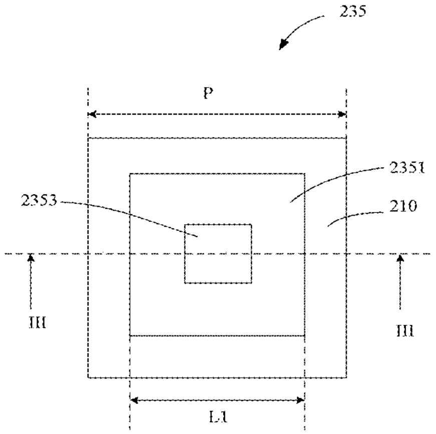
FIG. 16 is a top view illustrating a first resonant unit provided in other implementations of the present disclosure.
Figure 17:
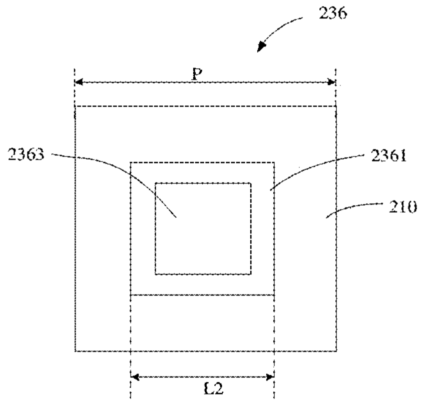
FIG. 17 is a bottom view illustrating a second resonant unit provided in other implementations of the present disclosure.
Figure 18:
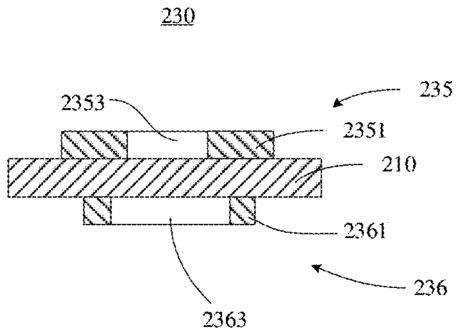
FIG. 18 is a cross-sectional view of FIG. 16, taken along III-III line.

Reference is made to FIG. 16, FIG. 17, and FIG. 18 together, where FIG. 16 is a top view illustrating a first resonant unit provided in other implementations of the present disclosure, FIG. 17 is a bottom view illustrating a second resonant unit provided in other implementations of the present disclosure, and FIG. 18 is a cross-sectional view of FIG. 16, taken along II-II line. In this implementation, the first resonant layer 235 includes multiple first resonant units 2351 arranged at regular intervals, the second resonant layer 236 includes multiple second resonant units 2361 arranged at regular intervals. Each of the multiple first resonant units 2351 is a conductive patch and defines a first hollow structure 2353 penetrating through two opposite surfaces of each of the multiple first resonant units 2351. Each of the multiple second resonant units 2361 is a conductive patch and defines a second hollow structure 2363 penetrating through two opposite surfaces of each of the multiple second resonant units 2361. Each of the multiple first resonant units 2351 has a side length of L1, each of the multiple second resonant units 2361 has a side length of L2, where $P>L1\geq L2$, and an area of the first hollow structure 2353 is less than an area of the second hollow structure 2363. This structure of the multiple first resonant units 2351 and the multiple second resonant units 2361 can make a resonant frequency of the first resonant layer 235 greater than a resonant frequency of the second resonant layer 236.

Compared to each of the multiple first resonant units 2351 without the first hollow structure 2353, by defining the first hollow structure 2353 on each of the multiple first resonant units 2351 in this implementation, the size of each of the multiple first resonant units 2351 can be reduced, which facilitates miniaturization of each of the multiple first resonant units 2351, and further facilitates miniaturization of the resonant structure 230.

Compared to each of the multiple second resonant units 2361 without the second hollow structure 2363, by defining the second hollow structure 2363 on each of the multiple second resonant units 2361 in this implementation, the size of each of the multiple second resonant units 2361 can be reduced, which facilitates miniaturization of each of the multiple second resonant units 2361, and further facilitates miniaturization of the resonant structure 230. In schematic views of the above implementations, an example that the first resonant layer 235 and the second resonant layer 236 are insulated is taken for illustration.

When the first resonant layer 235 and the second resonant layer 236 are insulated, there is no a connecting member for electrically connecting the first resonant layer 235 with the second resonant layer 236 between the first resonant layer 235 and the second resonant layer 236. In this case, the resonant structure 230 can be easily processed.

Figure 19:
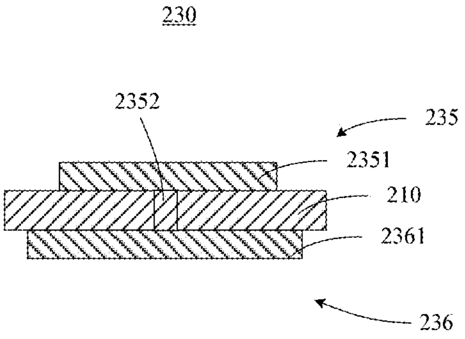
FIG. 19 is a schematic view illustrating an antenna apparatus provided in other implementations of the present disclosure.

Reference is made to FIG. 19, which is a schematic view illustrating an antenna apparatus provided in other implementations of the present disclosure. The antenna apparatus 10 is in conjunction with the first resonant unit 2351 and the second resonant unit 2361 which are provided in implementations corresponding to FIG. 10, FIG. 11, and FIG. 12 for illustration. The first resonant layer 235 is electrically connected with the second resonant layer 236 through a connecting member 2352. In this implementation, the first resonant layer 235 is electrically connected with and the second resonant layer 236 through the connecting member 2352, so that a high impedance can be formed on a surface of the antenna apparatus 10 and the RF signal cannot propagate along a surface of the antenna radome 200, which can improve a gain and a bandwidth of the RF signal, and reduce a back lobe, thereby improving a communication quality when the antenna apparatus 10 communicates through the RF signal. Furthermore, a center of the first resonant layer 235 is electrically connected with a center of the second resonant layer 236, which can further improve the gain and the bandwidth of the RF signal, and reduce the back lobe, thereby improving the communication quality when the antenna apparatus 10 communicates through the RF signal.

Figure 20:
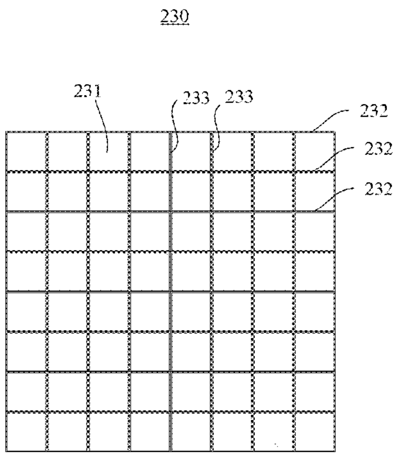
FIG. 20 is a schematic view illustrating a resonant structure provided in other implementations of the present disclosure.

Reference is made to FIG. 20, which is a schematic view illustrating a resonant structure provided in other implementations of the present disclosure. The resonant structure 230 includes multiple first conductive lines 232 spaced apart from one another and multiple second conductive lines 233 spaced apart from one another. The multiple first conductive lines 232 are intersected with the multiple second conductive lines 233, and the multiple first conductive lines 232 are electrically connected with the multiple second conductive lines 233 at intersections. Two adjacent first conductive lines 232 are intersected with two adjacent second conductive lines 233 to form a resonant unit 231. Optionally, the multiple first conductive lines 232 extend in a first direction and are spaced apart in a second direction. The multiple second conductive lines 233 extend in the second direction and are spaced apart in the first direction. The first direction is perpendicular to the second direction. In other words, the multiple first conductive lines 232 are vertically intersected with the multiple second conductive lines 233, and the multiple first conductive lines 232 are electrically connected with the multiple second conductive lines 233 at the intersections. Optionally, distances between any two adjacent first conductive lines 232 may be equal or unequal. Distances between any two adjacent second conductive lines 233 may or may not be equal. In the schematic view of this implementation, an example that the distances between any two adjacent first conductive lines 232 are equal and the distances between any two adjacent second conductive lines 233 are equal is taken for illustration.

In this implementation, the resonant unit 231 includes an intersection part of two adjacent first conductive lines 232 and two adjacent second conductive lines 233, and the intersection part forms a hollow. Compared to the resonant unit 231 whose shape is a conductive patch and does not define a hollow, the resonant unit 231 of the present disclosure has a smaller size for the RF signal of the preset frequency band, which facilitates integration and miniaturization of the antenna apparatus 10.

Figure 21:
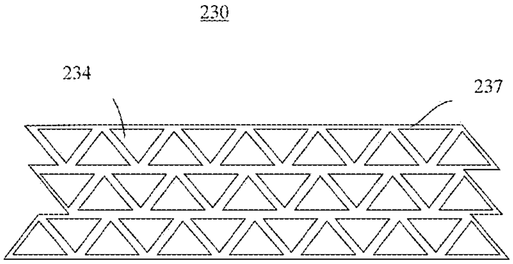
FIG. 21 is a schematic view illustrating a resonant structure provided in other implementations of the present disclosure.

Reference is made to FIG. 21, which is a schematic view illustrating a resonant structure provided in other implementations of the present disclosure. The resonant structure 230 includes multiple conductive grids 234 arranged in an array, each of the multiple conductive grids 234 is enclosed by at least one conductive line 237, and two adjacent conductive grids 234 at least partially share the at least one conductive line 237. The multiple conductive grids 234 arranged in an array constitute the resonant unit 231.

The shape of each of the multiple conductive grids 234 may be, but is not limited to, any one of a circle, a rectangle, a triangle, a polygon, and an ellipse. When each of the multiple conductive grids 234 is a polygon, the number of sides of each of the multiple conductive grids 234 is a positive integer greater than 3. In the schematic view of this implementation, an example that the shape of each of the multiple conductive grids 234 is a triangle is taken for illustration.

When the resonant structure 230 includes the multiple conductive grids 234 arranged in an array, compared to a resonant unit 231 whose shape is a conductive patch and does not define a hollow structure, the resonant unit 231 of the present disclosure has a smaller size for the RF signal of the present frequency band, which facilitates integration and miniaturization of the antenna apparatus 10. Furthermore, two adjacent conductive grids 234 at least partially share the at least one conductive line 237, which further reduces the size of the resonant unit 231.

Figure 22:
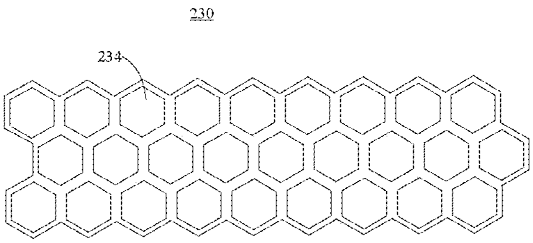
FIG. 22 is a schematic view illustrating a resonant structure provided in a other implementations of the present disclosure.

Reference is made to FIG. 22, which is a schematic view illustrating a resonant structure provided in other implementations of the present disclosure. In the schematic view of this implementation, an example that the shape of each of the multiple conductive grids 234 is a regular hexagon is taken for illustration.

Figure 23:
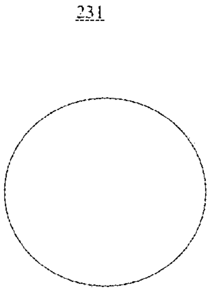
FIG. 23 to FIG. 30 are schematic structural views illustrating resonant units in a resonant structure.
Figure 24:
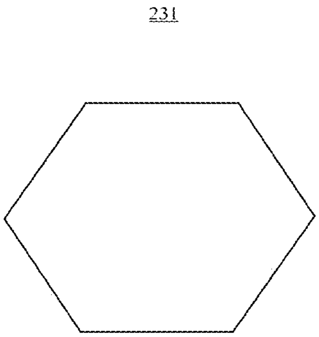
Figure 25:
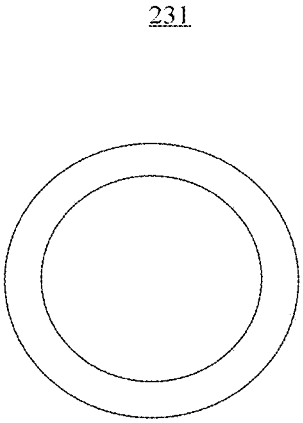
Figure 26:
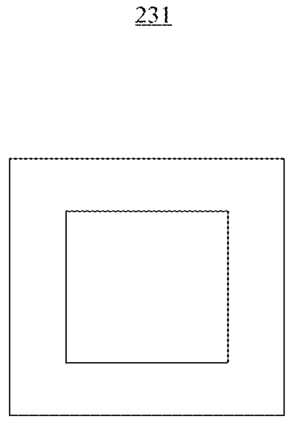
Figure 27:
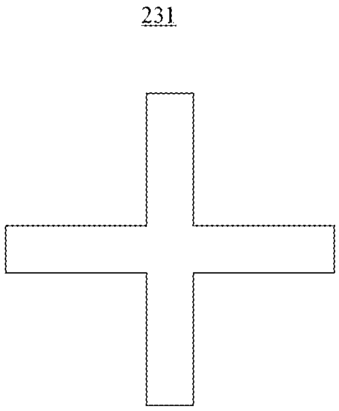
Figure 28:
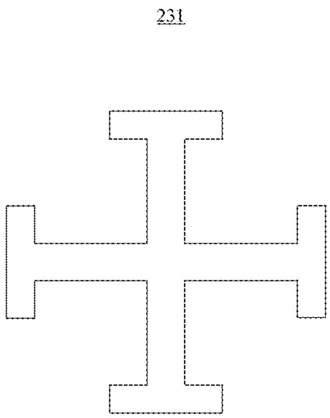
Figure 29:
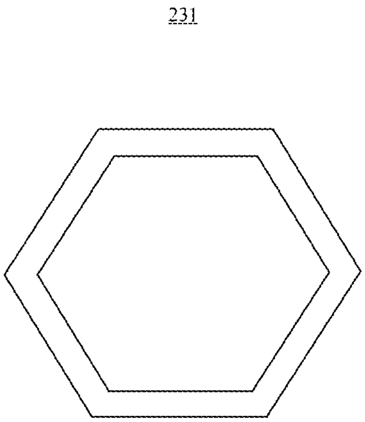
Figure 30:
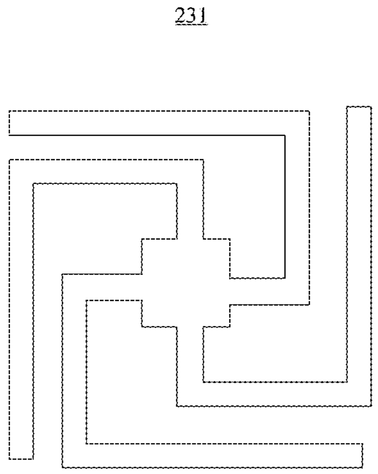

Reference is made FIG. 23 to FIG. 30, where FIG. 23 to FIG. 30 are schematic views illustrating resonant units in a resonant structure. A resonant unit 231 illustrated in FIG. 23 is a circular patch, and the resonant unit 231 does not define a hollow structure. A resonant unit 231 illustrated in FIG. 24 is a regular hexagonal patch. A resonant unit 231 illustrated in FIG. 25 is a circular patch and defines a circular hollow structure. A resonant unit 231 illustrated in FIG. 26 is a rectangular patch and defines a rectangular hollow structure. The shape of a resonant unit 231 illustrated in FIG. 27 is a cross. A resonant unit 231 illustrated in FIG. 28 and the resonant unit 231 illustrated in FIG. 27 have the similar shape, which is a Jerusalem cross. A resonant unit 231 illustrated in FIG. 29 is in a regular hexagon shape and defines a regular hexagonal hollow structure. A resonant unit 231 illustrated in FIG. 30 includes multiple surrounding branches, which can also be regarded as defining a hollow structure. In these schematic views, resonant units 231 with hollow structures may be the foregoing first resonant unit 2351 with the first hollow structure 2353, or the foregoing second resonant unit 2361 with the second hollow structure 2363.

Furthermore, a difference ϕR between a reflection phase of the resonant structure 230 to the RF signal of the preset frequency band and an incident phase of the resonant structure 230 to the RF signal of the preset frequency band satisfies:

$$\phi R = \frac{4\pi h}{c} f - (2N - 1)\pi,$$

where h represents the length of a center line from a radiation surface of the antenna module 100 to a surface of the resonant structure 230 facing the antenna module 100, c represents the speed of light, and f represents a frequency of the RF signal, and N represents a positive integer, the center line being a straight line perpendicular to the radiation surface of the antenna module 100.

When the difference between the reflection phase of the resonant structure 230 to the RF signal of the preset frequency band and the incident phase of the resonant structure 230 to the RF signal of the preset frequency band satisfies the above relationship, it can be seen that the difference ϕR between the reflection phase and the incident phase increases as a frequency of the RF signal increases, in this case, a bandwidth of the RF signal passing through the antenna radome 200 can be increased, in other words, the bandwidth of the RF signal can be broadened.

For the RF signal, since a conventional ground system is a perfect electric conductor (PEC), when the RF signal is incident on the PEC, a phase difference of −π will be generated. Therefore, for the RF signal, a condition for the antenna radome 200 to achieve resonance is $$h = \left(\frac{\phi R}{\pi} - 1\right)\frac{\lambda}{4} + N\frac{\lambda}{2},$$

where h represents the length of a line segment of the center line of the radiation surface of the antenna module 100 from the radiation surface to the surface of the resonant structure 230 facing the antenna module 100, ϕR represents the difference between the reflection phase of the resonant structure 230 to the RF signal and the incident phase of the resonant structure 230 to the RF signal, λ represents a wavelength of a first RF signal in the air, and N represents the positive integer, the center line being the straight line perpendicular to the radiation surface of the antenna module 100. When $$\phi R = 0,$$

$$h = \frac{\lambda}{4},$$

in this case, a distance from the radiation surface of the antenna module 100 to the surface of the resonant structure 230 facing the antenna module 100 is the closest for the RF signal. Therefore, the antenna apparatus 10 can have a smaller thickness. When the antenna apparatus 10 is applicable to the electronic device 1, the electronic device 1 can have a smaller thickness. In this implementation, selection of h can improve directivity and a gain of a beam of the RF signal, in other words, the resonant structure 230 can compensate a loss of the RF signal during transmission, such that the first RF signal can have a long transmission distance, thereby improving overall performance of the antenna apparatus 10. Therefore, the antenna apparatus 10 of the present disclosure can help to improve communication performance of the electronic device 1 to which the antenna apparatus 10 is applicable. Furthermore, compared to a complex circuit used to improve the directivity and the gain of the RF signal in tradition, the antenna radome 200 in the antenna apparatus 10 of the present disclosure has a simple structure, a small occupied area, and low costs, which helps to increase competitiveness of a product.

In this case, except that the antenna radome 200 reaches resonance, a maximum value of a directivity coefficient of a RF signal emitted out through the antenna radome 200 satisfies:

$$D_{max} = \frac{1+R}{1-R},$$

where $D_{max}$ represents the directivity coefficient of the first RF signal, $R=S_{11}^2$, and $S_{11}$ represents an amplitude of a reflection coefficient of the antenna radome 200 to the RF signal.

In the antenna apparatus 10 introduced in the above implementations, the preset frequency band at least includes a full frequency band of 3GPP mmWave. The preset frequency band includes the full frequency band of 3GPP mmWave, which can improve communication effect of the antenna apparatus 10.

Figure 31:
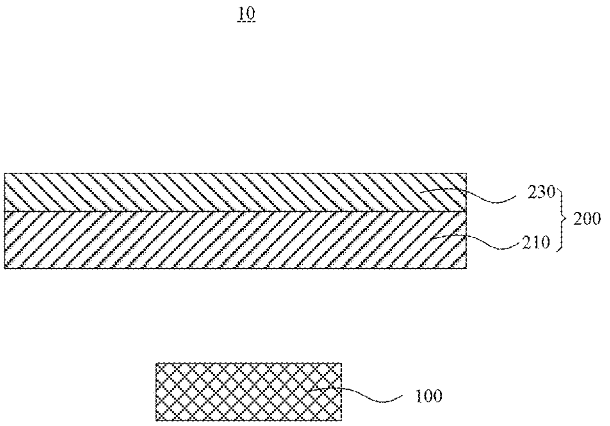
FIG. 31 is a schematic view illustrating an antenna apparatus provided in other implementations of the present disclosure.

Reference is made to FIG. 31, which is a schematic view illustrating an antenna apparatus provided in other implementations of the present disclosure. The antenna apparatus 10 includes an antenna module 100 and an antenna radome 200. The antenna module 100 is configured to receive and emit a RF signal of a preset frequency band toward a preset direction range. The antenna radome 200 is spaced apart from the antenna module 100, located within the preset direction range, and includes a substrate 210 and a resonant structure 230 carried on the substrate 210. A difference between a reflection phase of the antenna radome 200 to the RF signal of the preset frequency band and an incident phase of the antenna radome 200 to the RF signal of the preset frequency band increases as a frequency increases, and the RF signal of the preset frequency band is allowed to pass through the antenna radome 200.

Reference of structures of the antenna radome 200 and the resonant structure 230 can be made to the previous descriptions and related accompanying drawings, which will not be repeated here. When the difference between the reflection phase of the antenna radome 200 to the RF signal of the preset frequency band and the incident phase of the antenna radome 200 to the RF signal of the preset frequency band increases as the frequency increases, the difference ϕR between the reflection phase of the antenna radome 200 to the RF signal of the preset frequency band and the incident phase of the antenna radome 200 to the RF signal of the preset frequency band presents a positive phase gradient with change of the frequency, such that a bandwidth of the RF signal passing through the antenna radome 200 can be increased, in other words, the bandwidth of the RF signal passing through the antenna radome 200 can be broadened.

Optionally, the difference between the reflection phase of the substrate 210 to the RF signal of the preset frequency band and the incident phase of the substrate 210 to the RF signal of the preset frequency band decreases as the frequency increases. In other words, the difference between the reflection phase of the substrate 210 to the RF signal of the preset frequency band and the incident phase of the substrate 210 to the RF signal of the preset frequency band presents a negative phase gradient with change of the frequency. When the difference between the reflection phase of the substrate 210 to the RF signal of the preset frequency band and the incident phase of the substrate 210 to the RF signal of the present frequency band decreases as the frequency increases, the bandwidth of the RF signal passing through the substrate 210 is small. In the present disclosure, the resonant structure 230 is added, and the difference between the reflection phase of the resonant structure 230 to the RF signal of the preset frequency band and the incident phase of the resonant structure 230 to the RF signal of the preset frequency increases as the frequency increases, such that the difference ϕR between the reflection phase of the antenna radome 200 including the resonant structure 230 to the RF signal of the preset frequency band and the incident phase of the antenna radome 200 to the RF signal of the preset frequency band presents a positive phase gradient with change of the frequency.

Optionally, in other implementations, the difference between the reflection phase of the substrate 210 to the RF signal of the preset frequency band and the incident phase of the substrate 210 to the RF signal of the preset frequency band increases as the frequency increases, in other words, the difference between the reflection phase of the substrate 210 to the RF signal of the preset frequency band and the incident phase of the substrate 210 to the RF signal of the preset frequency band presents a positive phase gradient with change of the frequency. In this case, the bandwidth of the RF signal passing through the antenna radome 200 can be further broadened.

Optionally, the resonant structure 230 includes a first resonant layer 235 and a second resonant layer 236 which are stacked, and the first resonant layer 235 is farther away from the antenna module 100 than the second resonant layer 236. A resonant frequency of the first resonant layer 235 is a first frequency, a resonant frequency of the second resonant layer 236 is a second frequency, and the first frequency is greater than the second frequency. Reference is made to FIG. 9, which illustrates that the first resonant layer 235 and the second resonant layer 236 are disposed on two opposite surfaces of the substrate 210. It can be understood that a structure of the resonant structure 230 is not limited to a structure in FIG. 9, as long as the first resonant layer 235 and the second resonant layer 236 are stacked.

Optionally, referring to FIG. 10 to FIG. 12 again, the first resonant layer 235 includes the multiple first resonant units 2351 arranged at regular intervals, and the second resonant layer 236 includes the multiple second resonant units 2361 arranged at regular intervals. Each of the multiple first resonant units 2351 and each of the multiple second resonant units 2361 are both the conductive patches. Each of the multiple first resonant units 2351 has the side length of L1, each of the multiple second resonant units 2361 has the side length of L2, where L1<L2<P, and P is the arrangement interval of the multiple first resonant units 2351 and the multiple second resonant units 2361.

Optionally, a difference ϕR between a reflection phase of the resonant structure 230 to the RF signal of the preset frequency band and an incident phase of the resonant structure 230 to the RF signal of the preset frequency band satisfies:

$$\phi R = \frac{4\pi h}{c} f - (2N-1)\pi,$$

where h represents the length of a center line from a radiation surface of the antenna module 100 to a surface of the resonant structure 230 facing the antenna module 100, c represents the speed of light, f represents a frequency of the RF signal, and N represents a positive integer, the center line being a straight line perpendicular to the radiation surface of the antenna module 100. Reference of beneficial effects of the above relationship satisfied by the difference between the reflection phase of the resonant structure 230 to the RF signal of the preset frequency band and the incident phase can be made to the previous descriptions, which will not be repeated here.

Optionally, a maximum value $D_{max}$ of a directivity coefficient of the antenna module 100 satisfies:

$$D_{max} = \frac{1+R}{1-R},$$

where $R=S_{11}^2$, and $S_{11}$ represents an amplitude of a reflection coefficient of the antenna radome 200 to the RF signal. Reference of beneficial effects of $$D_{max} = \frac{1+R}{1-R}$$

being satisfied by the maximum value $D_{max}$ of the directivity coefficient of the antenna module 100 can be made to the previous descriptions, which will not be repeated here.

Figure 32:
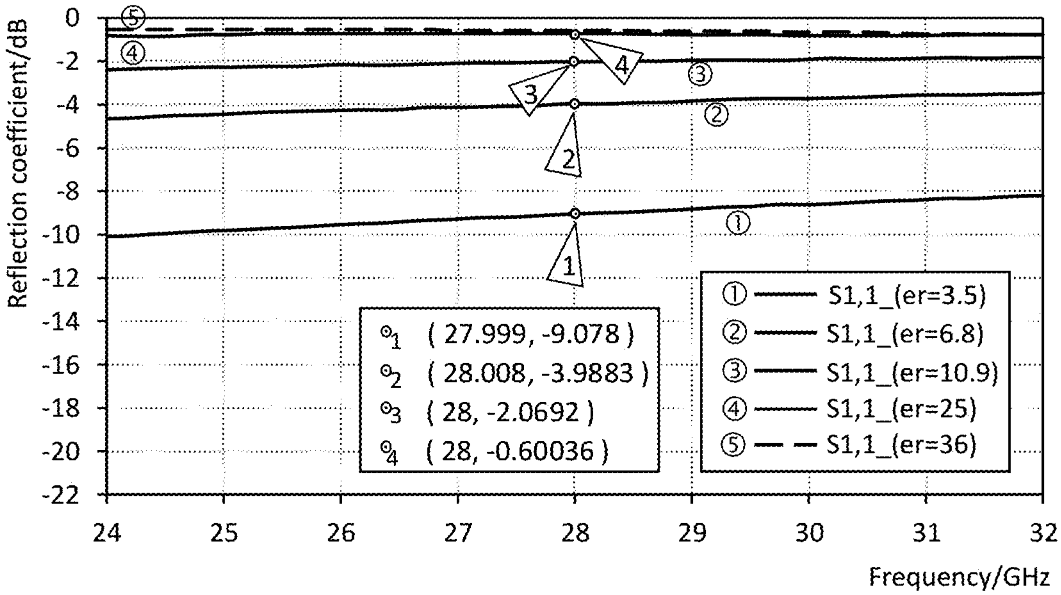
FIG. 32 illustrates reflection coefficient S11 curves corresponding to substrates with different dielectric constants.

The performance of the antenna module 100 of the present disclosure will be analyzed below with reference to simulation views. Reference can be made to FIG. 32, which illustrates reflection coefficient S11 curves corresponding to substrates with different dielectric constants. In this implementation, a simulation is performed with the substrate 210 having a thickness of 0.55 mm. In the schematic view, a horizontal axis represents a frequency in units of GHz, and a vertical axis represents a reflection coefficient in units of decibel (dB). In the schematic view, curve ① is a variation curve of a reflection coefficient S11 with the frequency when the substrate 210 has a dielectric constant of 3.5; curve ② is a variation curve of the reflection coefficient S11 with the frequency when the substrate 210 has the dielectric constant of 6.8; curve ③ is a variation curve of the reflection coefficient S11 with the frequency when the substrate 210 has the dielectric constant of 10.9; curve ④ is a variation curve of the reflection coefficient S11 with the frequency when the substrate 210 has the dielectric constant of 25; curve ⑤ is a variation curve of the reflection coefficient S11 with the frequency when the substrate 210 has the dielectric constant of 36. It can be seen from the schematic view that reflection coefficients S11 of the substrates 210 with different dielectric constants increase as dielectric constants increase. For the substrates 210 with the same dielectric constant, the reflection coefficients S11 do not change significantly with frequencies.

Figure 33:
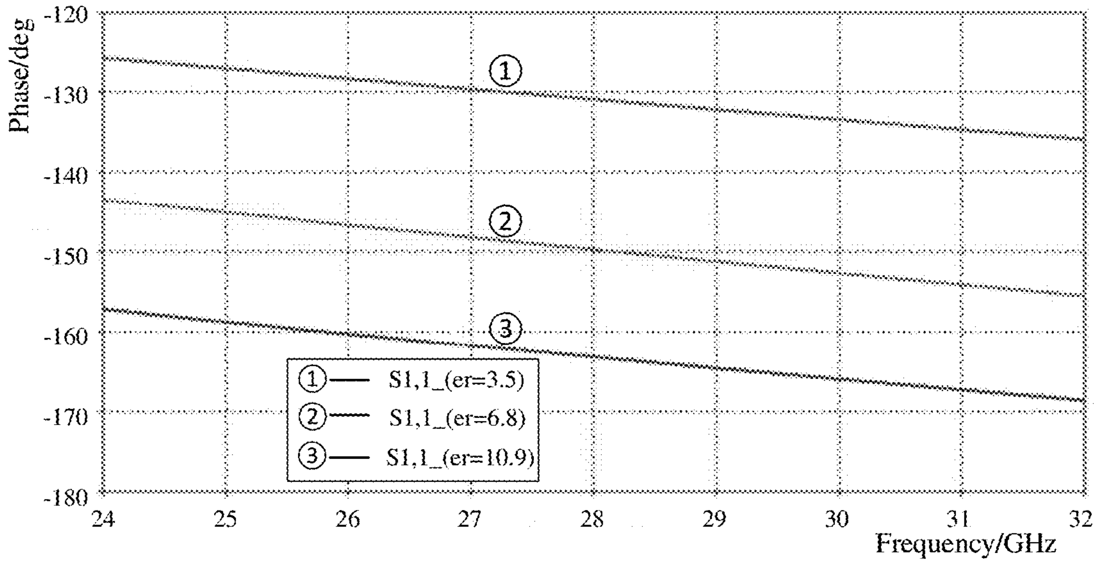
FIG. 33 illustrates reflection phase curves corresponding to substrates with different dielectric constants.

Reference is made to FIG. 33, which illustrates reflection phase curves corresponding to substrates with different dielectric constants. In this implementation, a simulation is performed with the substrate 210 having a thickness of 0.55 mm. In the schematic view, a horizontal axis represents a frequency in units of GHz, and a vertical axis represents a phase in units of degree (deg). In the schematic view, curve ① is a variation curve of a reflection phase with the frequency when the substrate 210 has a dielectric constant of 3.5; curve ② is a variation curve of the reflection phase with the frequency when the substrate 210 has the dielectric constant of 6.8; curve ③ is a variation curve of the reflection phase with the frequency when the substrate 210 has the dielectric constant of 10.9. It can be seen from the schematic view that for the substrates 210 with the same dielectric constant, the reflection phases of the substrates 210 decrease as frequencies increase. In other words, the difference between the reflection phase of the substrate 210 to the RF signal of the preset frequency band and the incident phase of the substrate 210 to the RF signal of the preset frequency band presents a negative phase gradient with change of the frequency.

Figure 34:
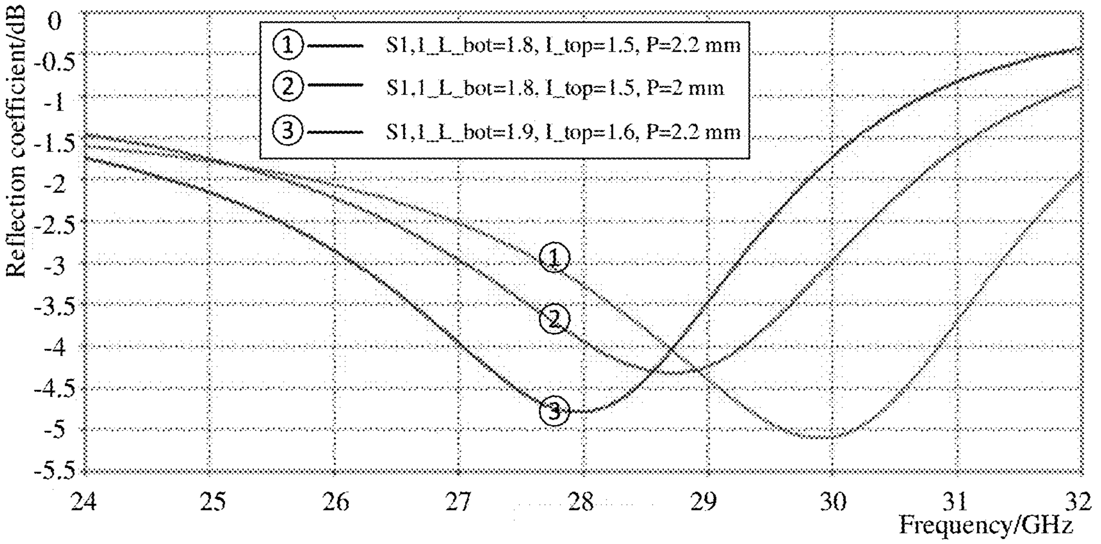
FIG. 34 is a schematic view illustrating curves of amplitudes of reflection coefficients S11 of antenna radomes provided in the present disclosure.

Reference is made to FIG. 34, which is a schematic view illustrating curves of amplitudes of reflection coefficients S11 of antenna radomes provided in the present disclosure. In this implementation, a structure that the antenna radome 200 includes a first resonant layer 235 and a second resonant layer 236 which are stacked, each of the first resonant layer 235 and the second resonant layer 236 includes square conductive patches, and the first resonant layer 235 is farther away from the antenna module 100 than the second resonant layer 236 is taken for simulation. In the schematic view, a horizontal axis represents the frequency in units of GHz, and a vertical axis represents a reflection coefficient in units of dB. In the schematic view, curve ① is a simulation curve with a structure that a square conductive patch of the first resonant layer 235 has a side length of 1.5 mm, a square conductive patch of the second resonant layer 236 has a side length of 1.8 mm, and an interval of any adjacent square conductive patches of each of the first resonant layer 235 and the second resonant layer 236 is 2.2 mm; curve ② is a simulation curve with a structure that the square conductive patch of the first resonant layer 235 has the side length of 1.5 mm, the square conductive patch of second resonant layer 236 has the side length of 1.8 mm, and the interval of any adjacent square conductive patches of each of the first resonant layer 235 and the second resonant layer 236 is 2 mm; curve ③ is a simulation curve with a structure that the square conductive patch of the first resonant layer 235 has the side length of 1.6 mm, the square conductive patch of the second resonant structure 236 has the side length of 1.9 mm, and the interval of any adjacent square conductive patches of each of the first resonant layer 235 and the second resonant layer 236 is 2.2 mm. It can be seen from these simulation curves that the reflection coefficient of the resonant structure 230 to a RF signal of each frequency band is large. Since the resonant structure 230 has a larger reflection coefficient to the RF signal of each frequency band, the RF signal has a larger directivity coefficient, and the RF signal has a better directivity. It can be seen that the RF signal has better directivity after passing through the antenna radome 200 of the present disclosure. When the antenna apparatus 10 is integrated into the electronic device 1, communication effect of the electronic device 1 can be improved.

Figure 35:
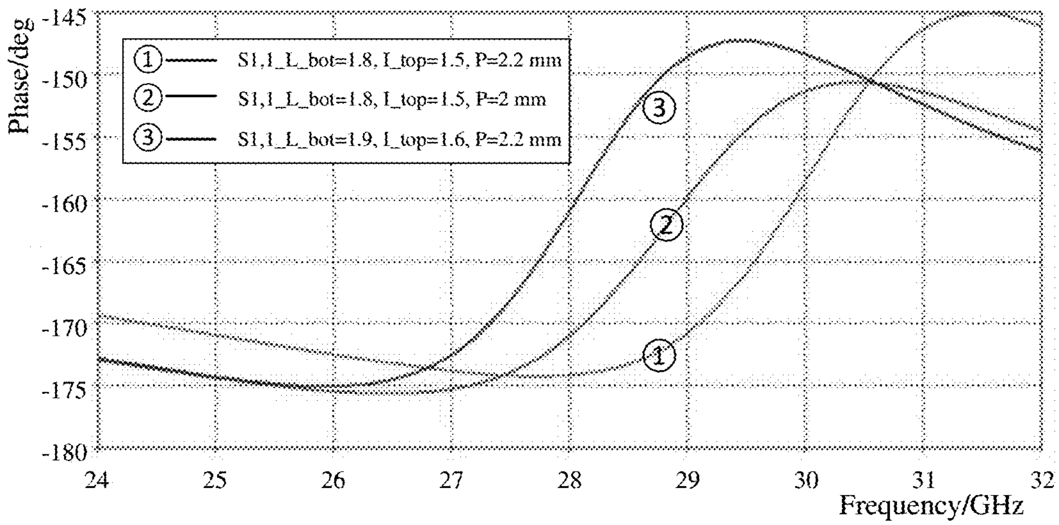
FIG. 35 is a schematic view illustrating curves of phases of reflection phases of antenna radomes provided in the present disclosure.

Reference is made to FIG. 35, which is a schematic view illustrating curves of phases of reflection phases of antenna radomes provided in the present disclosure. In this implementation, a structure that the antenna radome 200 includes a first resonant layer 235 and a second resonant layer 236 which are stacked, each of the first resonant layer 235 and the second resonant layer 236 includes square conductive patches, and the first resonant layer 235 is farther away from the antenna module 100 than the second resonant layer 236 is taken for simulation. In the schematic view, a horizontal axis represents the frequency in units of GHz, and a vertical axis represents a gain in units of dB. In the schematic view, curve ① is a simulation curve with a structure that a square conductive patch of the first resonant layer 235 has a side length of 1.5 mm, a square conductive patch of the second resonant layer 236 has a side length of 1.8 mm, and an interval of any adjacent square conductive patches of each of the first resonant layer 235 and the second resonant layer 236 is 2.2 mm; curve ② is a simulation curve with a structure that the square conductive patch of the first resonant layer 235 has the side length of 1.5 mm, the square conductive patch of the second resonant layer 236 has the side length of 1.8 mm, and the interval of any adjacent square conductive patches of each of the first resonant layer 235 and the second resonant layer 236 is 2 mm; curve ③ is a simulation curve with a structure that the square conductive patch of the first resonant layer 235 has the side length of 1.6 mm, the square conductive patch of the second resonant structure 236 has the side length of 1.9 mm, and the interval any adjacent square conductive patches of each of the first resonant layer 235 and the second resonant layer 236 is 2.2 mm. It can be seen from these simulation curves that in a range of 26-30 GHz, each curve is upward, and a difference ϕR between a reflection phase of the antenna radome 200 to a RF signal of a frequency range of 26-30 GHz and an incident phase of the antenna radome 200 to the RF signal of the frequency range of 26-30 GHz presents a positive phase gradient with change of the frequency, which can increase a bandwidth of the RF signal passing through the antenna radome 200, in other words, due to the resonant structure 230, the bandwidth of the RF signal passing through the antenna radome 200 is broadened.

Figure 36:
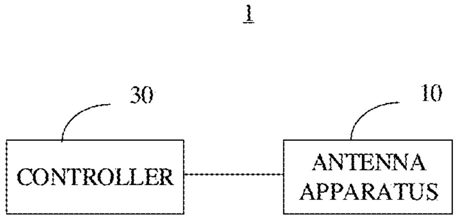
FIG. 36 is a circuit block view illustrating an electronic device provided in implementations of the present disclosure.

An electronic device 1 is also provided in the present disclosure. The electronic device 1 provided in the present disclosure will be introduced below with reference to the previous described antenna apparatus 10. Reference is made to FIG. 36, which is a circuit block view illustrating an electronic device provided in implementations of the present disclosure. The electronic device 1 includes a controller 30 and the antenna apparatus 10 in any of the above implementations. The antenna apparatus 10 is electrically connected with the controller 30. The antenna module 100 in the antenna apparatus 10 is configured to receive and emit a RF signal through the antenna radome 200 in the antenna apparatus 10 under control of the controller 30.

Figure 37:
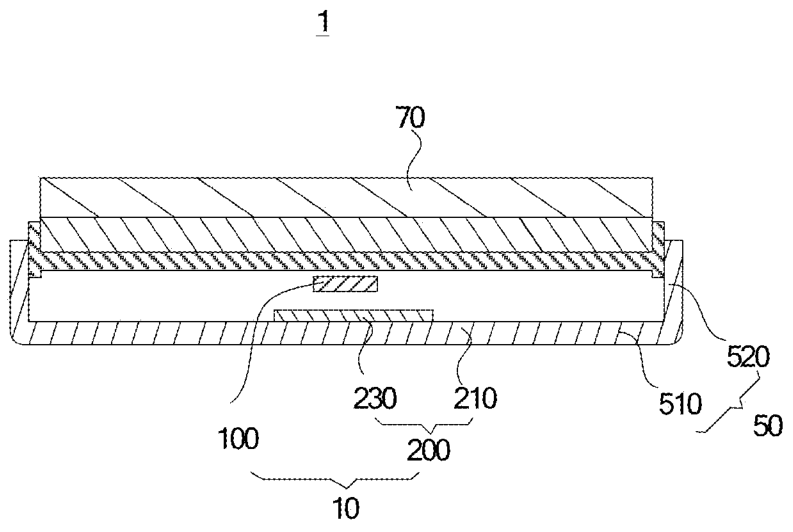
FIG. 37 is a schematic structural view illustrating an electronic device provided in implementations of the present disclosure.

Reference is made to FIG. 37, which is a schematic structural view illustrating an electronic device provided in implementations of the present disclosure. The electronic device 1 includes a battery cover 50, the substrate 210 at least includes the battery cover 50, and the battery cover 50 is located within a preset direction range of the RF signal of the preset frequency band received and emitted by the antenna module 100. In an implementation, the resonant structure 230 is directly prepared on an outer surface of the battery cover 50. In other words, the resonant structure 230 is directly prepared on a surface of the battery cover 50 away from the antenna module 100. Since the battery cover 50 has a smooth outer surface, by directly preparing the resonant structure 230 on the outer surface of the battery cover 50, difficulty of preparing the resonant structure 230 can be reduced. In another implementation, the resonant structure 230 is directly prepared in an inner surface of the battery cover 50. In other words, the resonant structure 230 is directly prepared on a surface of the battery cover 50 facing the antenna module 100. By directly preparing the resonant structure 230 on the inner surface of the battery cover 50, the battery cover 50 can constitute a protection layer of the resonant structure 230, which can reduce or avoid wear of external objects on the resonant structure 230. In yet another other implementation, the resonant structure 230 is attached to a carrier film 220 and then attached to the inner surface or the outer surface of the battery cover 50 through the carrier film 220. Reference of the carrier film 220 can be made to the previous descriptions of the antenna apparatus 10, which will not be repeated here. When the resonant structure 230 is attached to the carrier film 220 and then attached to the inner surface or the outer surface of the battery cover 50 through the carrier film 220, difficulty of disposing the resonant structure 230 on the battery cover 50 can be reduced. In the schematic view of this implementation, an example that the resonant structure 230 is located on a side of the battery cover 50 facing the antenna module 100 and the resonant structure 230 is directly disposed on the surface of the battery cover 50 facing the antenna module 100 is taken for illustration.

It can be understood that the resonant structure 230 is disposed corresponding to a part of the battery cover 50 or the whole battery cover 50. The resonant structure 230 may be integrated or non-integrated.

Optionally, the battery cover 50 includes a back plate 510 and a frame 520 connected with a periphery of the back plate 510, and the back plate 510 is located within the preset direction range. The substrate 210 at least includes the back plate 510, and the resonant structure 230 is carried on the back plate 510. Generally, an area of the back plate 510 is larger than an area of the frame 520. The resonant structure 230 is carried on the back plate 510, which facilitates placement of the resonant structure 230.

In the schematic view of this implementation, an example that the resonant structure 230 is disposed corresponding to a part of the battery cover 50 and the resonant structure 230 is disposed on the inner surface of the battery cover 50 is taken for illustration.

Furthermore, the electronic device 1 also includes a screen 70. The screen 70 is disposed at an opening of the battery cover 50. The screen 70 is configured to display texts, images, videos, etc.

Figure 38:
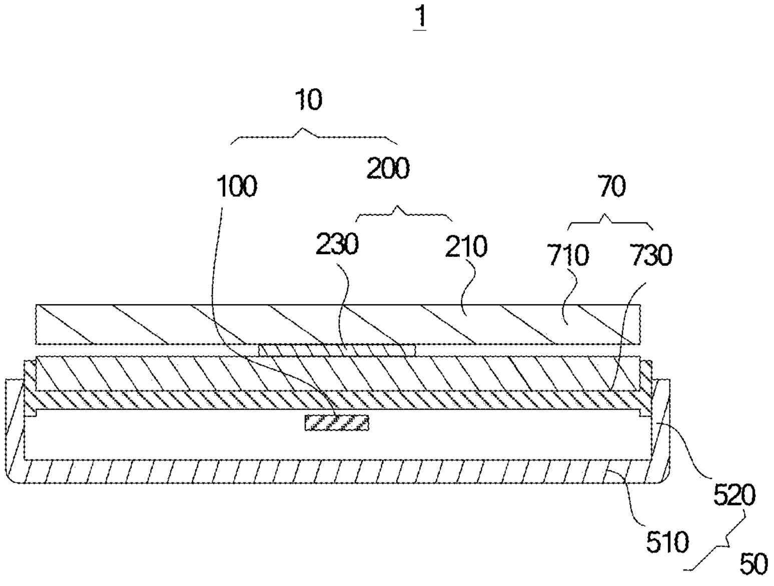
FIG. 38 is a schematic structural view illustrating an electronic device provided in other implementations of the present disclosure.

Reference is made to FIG. 38, which is schematic structural view illustrating an electronic device provided in other implementations of the present disclosure. The electronic device 1 includes a screen 70, the substrate 210 at least includes the screen 70, the screen 70 includes a cover plate 710 and a display module 730 stacked with the cover plate 710, and the resonant structure 230 is located between the cover plate 710 and the display module 730. The display module 730 may be, but is not limited to, a liquid display module 730, or an organic light-emitting diode (OLED) display module 730, correspondingly, the screen 70 may be, but is not limited to, a liquid display screen or an OLED display screen.

It can be understood that in an implementation, the resonant structure 230 may be directly disposed on a surface of the cover plate 710 facing the display module 730, or attached to an inner surface of the cover plate 710 through a carrier film. In another implementation, the resonant structure 230 may be directly disposed on the display module 730, or attached to the display module 730 through the carrier film. The resonant structure 230 may be disposed corresponding to a part of the cover plate 710 or the whole cover plate 710. The resonant structure 230 may be integrated or non-integrated. In order not to affect light transmittance of the screen 70, the resonant structure 230 is transparent.

In this implementation, an example that the resonant structure 230 is directly disposed on the surface of the cover plate 710 facing the display module 730 and the resonant structure 230 is disposed corresponding to a part of the cover plate 710 is taken for illustration.

Furthermore, the electronic device 1 also includes a battery cover 50, and the screen 70 is disposed on an opening of the battery cover 50. Generally, the battery cover 50 includes a back plate 510 and a frame 520 bendably connected with a periphery of the back plate 510.

In an implementation, the resonant structure 230 is located on the surface of the cover plate 710 facing the display module 730. The resonant structure 230 is located on the surface of the cover plate 710 facing the display module 730, which can reduce difficulty of forming the resonant structure 230 on the cover plate 710, compared to the resonant structure 230 being disposed in the display module 730.

It can be understood that the resonant structure 230 may be disposed corresponding to a part of the cover plate 710 or the whole cover plate 710. The resonant structure 230 may be integrated or non-integrated.

Although the implementations of the present disclosure have been shown and described above, it can be understood that the above implementations are exemplary and cannot be understood as limitations to the present disclosure. Those of ordinary skill in the art can change, amend, replace, and modify the above implementations within the scope of the present disclosure, and these modifications and improvements are also regarded as the protection scope of the present disclosure.

What is claimed is:

1. An antenna apparatus, comprising:

an antenna module configured to receive and emit a radio frequency (RF) signal of a preset frequency band toward a preset direction range; and an antenna radome, spaced apart from the antenna module, located within the preset direction range, and comprising a substrate and a resonant structure carried on the substrate;

wherein the substrate is configured to allow a RF signal of a first frequency band in the preset frequency band to pass through, the resonant structure is configured to adjust a passband width of the substrate to the RF signal of the preset frequency band, to make the antenna radome allow a RF signal of a second frequency band in the preset frequency band to pass through, wherein a bandwidth of the second frequency band is greater than a bandwidth of the first frequency band, and the RF signal of the second frequency band comprises the RF signal of the first frequency band;

wherein the resonant structure comprises a first resonant layer and a second resonant layer that are stacked, the first resonant layer is farther away from the antenna module than the second resonant layer, a resonant frequency of the first resonant layer is a first frequency, a resonant frequency of the second resonant layer is a second frequency, and the first frequency is greater than the second frequency.

2. The antenna apparatus of claim 1, wherein the first resonant layer comprises a plurality of first resonant units arranged at regular intervals, the second resonant layer comprises a plurality of second resonant units arranged at regular intervals, each of the plurality of first resonant units and each of the plurality of second resonant units are both conductive patches, each of the plurality of first resonant units has a side length of L1, each of the plurality of second resonant units has a side length of L2, wherein L1<L2<P, and P is an arrangement interval of the plurality of first resonant units and the plurality of second resonant units.

3. The antenna apparatus of claim 1, wherein the first resonant layer comprises a plurality of first resonant units arranged at regular intervals, the second resonant layer comprises a plurality of second resonant units arranged at regular intervals, each of the plurality of first resonant units is a conductive patch, each of the plurality of second resonant units is a conductive patch and defines a hollow structure penetrating through two opposite surfaces of each of the plurality of second resonant units, each of the plurality of first resonant units has a side length of L1, each of the plurality of second resonant units has a side length of L2, wherein P>L1≥L2, P is an arrangement interval of the plurality of first resonant units and the plurality of second resonant units, and a larger area of the hollow structure leads to a greater difference between L1 and L2.

4. The antenna apparatus of claim 1, wherein the first resonant layer comprises a plurality of first resonant units arranged at regular intervals, the second resonant layer comprises a plurality of second resonant units arranged at regular intervals, each of the plurality of first resonant units is a conductive patch and defines a first hollow structure penetrating through two opposite surfaces of each of the plurality of first resonant units, each of the plurality of second resonant units is a conductive patch and defines a second hollow structure penetrating through two opposite surfaces of each of the plurality of second resonant units, an arrangement interval of the plurality of first resonant units and the plurality of second resonant units is P, each of the plurality of first resonant units has a side length of L1, each of the plurality of second resonant units has a side length of L2, wherein P>L1≥L2, and an area of the first hollow structure is less than an area of the second hollow structure.

5. The antenna apparatus of claim 1, wherein the first resonant layer is electrically connected with the second resonant layer through a connecting member.

6. The antenna apparatus of claim 1, wherein the resonant structure comprises a plurality of first conductive lines spaced apart from one another and a plurality of second conductive lines spaced apart from one another, the plurality of first conductive lines are intersected with the plurality of second conductive lines, and the plurality of first conductive lines are electrically connected with the plurality of second conductive lines at intersections.

7. The antenna apparatus of claim 1, wherein the resonant structure comprises a plurality of conductive grids arranged in an array, each of the plurality of conductive grids is enclosed by at least one conductive line, and two adjacent conductive grids at least partially share the at least one conductive line.

8. The antenna apparatus of claim 1, wherein a difference ϕR between a reflection phase of the resonant structure to the RF signal of the preset frequency band and an incident phase of the resonant structure to the RF signal of the preset frequency band satisfies:

$$\phi R = \frac{4\pi h}{c} f - (2N - 1)\pi;$$

wherein h represents the length of a center line from a radiation surface of the antenna module to a surface of the resonant structure facing the antenna module, c represents the speed of light, and f represents a frequency of the RF signal, the center line being a straight line perpendicular to the radiation surface of the antenna module.

9. The antenna apparatus of claim 8, wherein a maximum value $D_{max}$ of a directivity coefficient of the antenna module satisfies:

$$D_{max} = \frac{1 + R}{1 - R};$$

wherein $K=S_{11}^2$, and $S_{11}$ represents an amplitude of a reflection coefficient of the antenna radome to the RF signal.

10. An antenna apparatus, comprising:

an antenna module configured to receive and emit a radio frequency (RF) signal of a preset frequency band toward a preset direction range; and an antenna radome spaced apart from the antenna module, located within the preset direction range, and comprising a substrate and a resonant structure carried on the substrate;

wherein a difference between a reflection phase of the antenna radome to the RF signal of the preset frequency band and an incident phase of the antenna radome to the RF signal of the preset frequency band increases as a frequency of the RF signal increases, and the RF signal of the preset frequency band is allowed to pass through the antenna radome;

wherein the resonant structure comprises a first resonant layer and a second resonant layer that are stacked, the first resonant layer is farther away from the antenna module than the second resonant layer, a resonant frequency of the first resonant layer is a first frequency, a resonant frequency of the second resonant layer is a second frequency, and the first frequency is greater than the second frequency.

11. The antenna apparatus of claim 10, wherein a difference between a reflection phase of the substrate to the RF signal of the preset frequency band and an incident phase of the substrate to the RF signal of the preset frequency band decreases as the frequency increases, and a difference between a reflection phase of the resonant structure to the RF signal of the preset frequency band and an incident phase of the resonant structure to the RF signal of the preset frequency band increases as the frequency increases.

12. The antenna apparatus of claim 10, wherein the first resonant layer comprises a plurality of first resonant units arranged at regular intervals, the second resonant layer comprises a plurality of second resonant units arranged at regular intervals, each of the plurality of first resonant units and each of the plurality of second resonant units are both conductive patches, each of the plurality of first resonant units has a side length of L1, each of the plurality of second resonant units has a side length of L2, wherein L1<L2<P, and P is an arrangement interval of the plurality of first resonant units and the plurality of second resonant units.

13. The antenna apparatus of claim 10, wherein a difference ϕR between a reflection phase of the resonant structure to the RF signal of the preset frequency band and an incident phase of the resonant structure to the RF signal of the preset frequency band satisfies:

$$\phi R = \frac{4\pi h}{c} f - (2N - 1)\pi;$$

wherein h represents the length of a center line from a radiation surface of the antenna module to a surface of the resonant structure facing the antenna module, c represents the speed of light, and f represents a frequency of the RF signal, the center line being a straight line perpendicular to the radiation surface of the antenna module.

14. The antenna apparatus of claim 13, wherein a maximum value $D_{max}$ of a directivity coefficient of the antenna module satisfies:

$$D_{max} = \frac{1 + R}{1 - R};$$

wherein $R=S_{11}^2$, and $S_{11}$ represents an amplitude of a reflection coefficient of the antenna radome to the RF signal.

15. An electronic device, comprising:

a controller; and an antenna apparatus, wherein the antenna apparatus is electrically connected with the controller;

wherein the antenna apparatus comprises:

an antenna module configured to receive and emit a radio frequency (RF) signal of a preset frequency band toward a preset direction range;

an antenna radome, spaced apart from the antenna module, located within the preset direction range, and comprising a substrate and a resonant structure carried on the substrate;

wherein the substrate is configured to allow a RF signal of a first frequency band in the preset frequency band to pass through, the resonant structure is configured to adjust a passband width of the substrate to the RF signal of the preset frequency band, to make the antenna radome allow a RF signal of a second frequency band in the preset frequency band to pass through, wherein a bandwidth of the second frequency band is greater than a bandwidth of the first frequency band, and the RF signal of the second frequency band comprises the RF signal of the first frequency band;

wherein the antenna module in the antenna apparatus is configured to receive and emit the RF signal through the antenna radome in the antenna apparatus under control of the controller; and wherein the substrate at least comprises a battery cover, the battery cover is located within the preset direction range of the RF signal of the preset frequency band received and emitted by the antenna module, and the resonant structure is located on a side of the battery cover facing the antenna module.

16. The electronic device of claim 15, wherein the battery cover comprises a back plate and a frame connected with a periphery of the back plate, and the back plate is located within the preset direction range.

17. The electronic device of claim 15, further comprising:

a screen, wherein the substrate at least comprises the screen, the screen comprises a cover plate and a display module stacked with the cover plate, and the resonant structure is located between the cover plate and the display module.

18. The electronic device of claim 15, wherein the resonant structure comprises a first resonant layer and a second resonant layer which are stacked, the first resonant layer is farther away from the antenna module than the second resonant layer, a resonant frequency of the first resonant layer is a first frequency, a resonant frequency of the second resonant layer is a second frequency, and the first frequency is greater than the second frequency.

19. The electronic device of claim 15, wherein the first resonant layer comprises a plurality of first resonant units arranged at regular intervals, the second resonant layer comprises a plurality of second resonant units arranged at regular intervals, each of the plurality of first resonant units and each of the plurality of second resonant units are both conductive patches, each of the plurality of first resonant units has a side length of L1, each of the plurality of second resonant units has a side length of L2, wherein $L1<L2<P$, and P is an arrangement interval of the plurality of first resonant units and the plurality of second resonant units.

20. The electronic device of claim 15, wherein the first resonant layer is electrically connected with the second resonant layer through a connecting member.

* * * * *